United States Patent [19]

Lee

[11] Patent Number: 4,889,449

[45] Date of Patent: Dec. 26, 1989

[54] SLIPLINER GROUTING METHOD AND SYSTEM

[75] Inventor: Lindsey D. Lee, Houston, Tex.

[73] Assignee: Halliburton Company, Duncan, Okla.

[21] Appl. No.: 247,150

[22] Filed: Sep. 21, 1988

[51] Int. Cl.⁴ .................. E02D 29/10; E21F 15/00
[52] U.S. Cl. .................... 405/154; 138/93; 138/98; 264/36; 405/146
[58] Field of Search ............ 405/150, 154, 155, 172, 405/18, 19; 264/86, 262, 269; 138/93, 97, 98

[56] References Cited

U.S. PATENT DOCUMENTS

| | | | |
|---|---|---|---|
| 3,269,421 | 8/1966 | Telford et al. | 138/97 |
| 3,396,545 | 8/1968 | Lamberton | 405/233 |
| 3,524,320 | 8/1970 | Turzillo | 405/18 |
| 4,072,018 | 2/1978 | Alvarez-Calderon | 405/289 X |
| 4,502,815 | 3/1985 | Scales et al. | 405/18 X |

FOREIGN PATENT DOCUMENTS 2097892 11/1982 United Kingdom .................. 138/97

*Primary Examiner*—Dennis Taylor
*Assistant Examiner*—Arlen L. Olsen
*Attorney, Agent, or Firm*—James R. Duzan

[57] ABSTRACT

The present invention is directed to the control of the movement of slip liners in grouting operations through the use of inflatable grouting bags and to the control of bulkhead sealing in slip liner grouting operations.

15 Claims, 4 Drawing Sheets

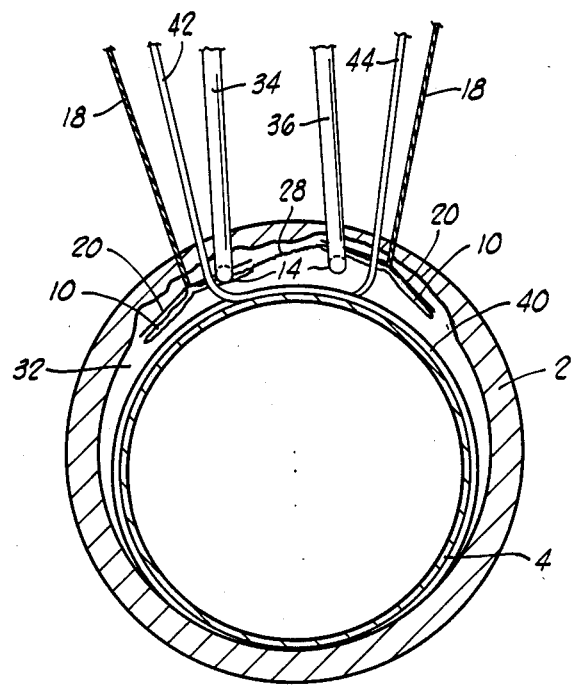
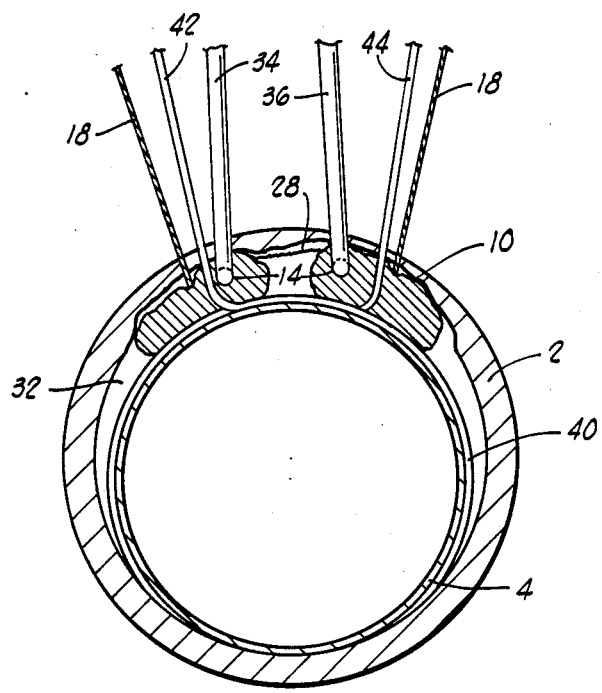

SLIPLINER GROUTING METHOD AND SYSTEM

BACKGROUND OF THE INVENTION

This invention relates to inflatable sealing and positioning devices used in grouting operations. More specifically, the invention relates to inflatable grouting bags for use in slipliner grouting operations for the repair of sewer and drain pipes.

Many cities and municipal utility districts are having to repair sanitary and storm sewers. A leaking sewer will typically allow sand, clays, silts and other materials to seep into the sewer. The subsequent flow of water through the sewer carries such materials away so that with time voids are created around the exterior of the sewer which are not usually noticed until buildings, roadways or houses are either damaged or in danger of damage due to subsidence.

Alternately, sewer failure may be caused by the chemical attack of the sewer or improper installation of the sewer.

With respect to chemical attack, sanitary sewers and, ocassionally, storm sewers will be subjected to corrosive gases, such as hydrogen sulfide. Typically, concrete sewers are lined with a corrosion proof liner of flexible plastic which, when intact, prevents the corrosion of the sewer. When the corrosion liner fails, it ultimately allows the attack and failure of the sewer with subsequent exchange of fluids and solids between the sewer and surrounding earth.

Regarding improper installation of the sewer, if jointed reinforced concrete sewer pipe is improperly installed, buoyancy and gravity forces on the sewer pipe may cause damage to the sewer pipe, cause sewer pipe movement and may cause sewer pipe joints to open thereby allowing the exchange of fluid and solids with the surrounding earth.

A typical repair procedure for sewers involves the placement of a liner pipe of plastic material, such as fiberglass, smooth wall polyethylene, or composites of polyethylene and polyproplene, inside the existing sewer. After the plastic material pipe has been placed inside the sewer, the annulus between the liner pipe and sewer is filled with a cementitious grout. This procedure of lining the sewer is commonly called slip lining.

As most slip lining operations are carried out with the sewer in service, the slip liner is installed with fluid flowing through the sewer, slip liner and annulus. After the ends of the sewer and slip liner are mechanically sealed, the fluid flow is diverted into the slip liner, and the annular space between the slip liner and sewer, being partially filled with water, can be grouted.

In slip liner grouting operations some problems that exist are grout placement, floation of the slip liner during grouting operations and bulkhead installation and sealing. Regarding grout placement problems, the slip liners are very easily damaged during grouting operations due to the hydrostatic pressure of the grout collapsing the slip liner. Typically, hydrostatic pressure differentials of five (5) to ten (10) pounds per square inch (psi) pressure may cause the slip liner to collapse. With respect to floation of the slip liner during grouting, the buoyancy force on the slip liner may distort the slip liner locally or may cause misalignment of the slip liner within the sewer which may affect the flow characteristics of the slip lined sewer. Finally, bulkhead installation and sealing may be a problem in installing a slip liner in a sewer as low viscosity grouts are difficult to contain in the annulus between the slip liner and sewer at the bulkhead necessary for grouting operations.

SUMMARY OF THE INVENTION

The present invention is directed to the control of movement of slip liners in grouting operations through the use of inflatable grouting bags. The present invention is also directed to the control of bulkhead sealing in slip liner grouting operations through the use of inflatable grouting bags.

BRIEF DESCRIPTION OF THE DRAWINGS

FIG. 8 is an end view of the grout containers and bulkhead grout containers of the present invention installed between a slip liner and sewer.

FIG. 9 is an end view of filled grout containers and an unfilled bulkhead grout container of the present invention installed between a slip liner and sewer.

DESCRIPTION OF THE INVENTION

Figure 1:
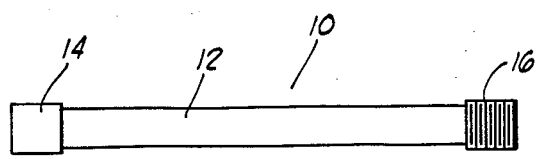
FIG. 1 is a view of a grout container of the present invention.

Referring to FIG. 1, a grout bag 10 of the present invention is shown. The grout bag 10 comprises a flexible inflatable bag 12, female coupling 14 and male coupling 16. The flexible inflatable bag 12 may be constructed of clothlike canvas material, reinforced elastomeric material, etc. The grout bags 10 may be of any convenient length, although a length of five (5) to ten (10) feet is preferred. The female 14 and male 16 couplings may be of any size, although a one (1) inch diameter coupling is preferred.

Figure 2:
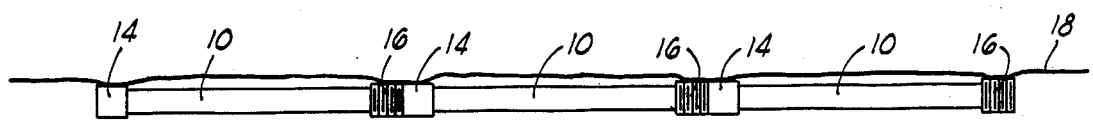
FIG. 2 is a view of a plurality of interconnected grout bags of the present invention.

Referring to FIG. 2, a plurality of grout bags 10 are shown being interconnected by their couplings 16 and 14 as well as a cable 18 secured to portions of the couplings 16 and 14.

Figure 3:
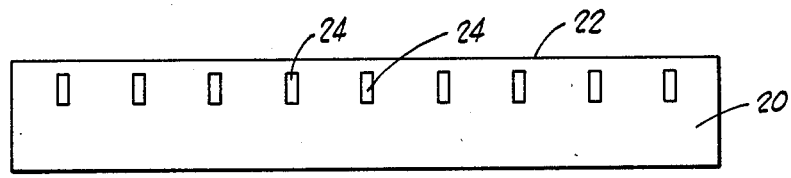
FIG. 3 is a view of the grout container protector of the present invention.

Referring to FIG. 3, a grout bag protector 20 is shown. The grout bag protector 20 comprises an elongated rectangular piece of material which is folded in half about its centerline 22 having a plurality of slots 24 in each half of the material near the centerline 22 thereof. The grout bag protector 20 may be formed from any suitable material such as thin plastic, plastic laminated cardboard, etc. The purpose of the grout bag protector 20 is to protect the grout bag 10 from damage during installation of the grout bag 10 in a sewer.

Figure 4:
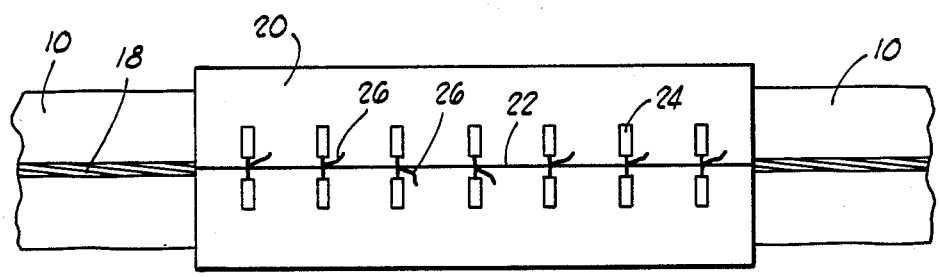
FIG. 4 is a view of the grout container protector installed on a grout container of the present invention.

Referring to FIG. 4, a grout bag protector 20 is shown installed over a plurality of grout bags 10 being secured in position by securing the grout bag protector through the use of ties 26 through slots 24 of the protector 20 wrapped about and tied to cable 18 secured to the grout bags 10.

Figure 5:
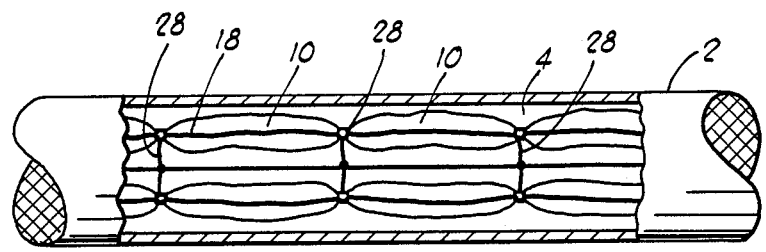
FIG. 5 is a top view of the grout containers without grout container protectors installed between a slip liner and sewer.

Referring to FIG. 5, a plurality of grout bags 10 are shown installed in a sewer 2 having a slip liner 4 therein with the grout protectors 20 being removed from the grout bags 10. Two rows of lines of grout bags 10 are shown being installed on the top of the slip liner 4 to prevent the slip liner 4 from floating in the sewer 2 during grouting operations permanently installing the slip liner 4 in the sewer 2. To keep each row or line of grout bags 10 in position on top of the slip liner 4 cross-connecting cables 28 have been intermittently installed to tie or interconnect each row of grout bags 10.

Figure 6:
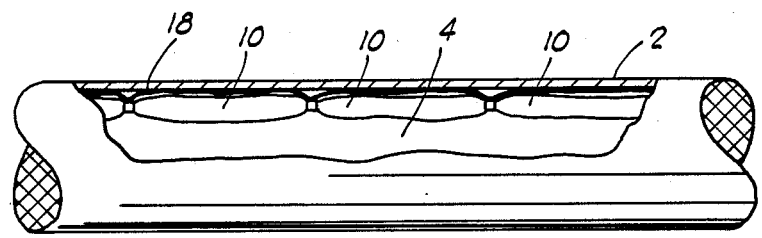
FIG. 6 is a side view of the grout containers without grout container protectors installed between a slip liner and sewer.

Referring to FIG. 6, a row or line of grout bags 10 interconnected by cable 18 are shown on one side of a slip liner 4 installed in a sewer 2.

Figure 7:
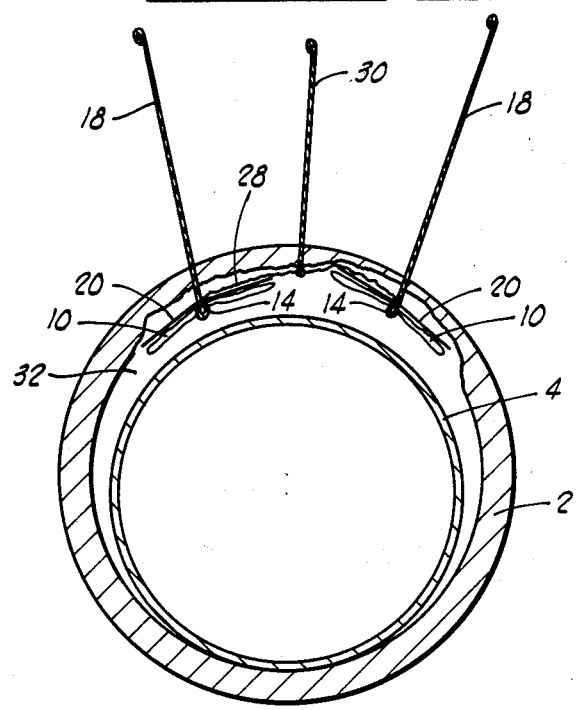
FIG. 7 is a end view of the grout containers of the present invention installed between a slip liner and sewer.

Referring to FIG. 7, an end view of the grout bags 10, grout protectors 20, grout bag cables 18, cross-connecting 28, guide cable 30 used to guide the grout bags 10 into the annular space 32 between the sewer 2 and slip liner 4 are shown. A guide cable 30 is installed in tension in the annular space 32 at the top of the slip liner 4 to act as a guide cable to center the rows of grout bags 10 about the guide cable 30 when the grout bag cables 30 are used to pull the grout bags 10 through the annular space 32.

Referring to FIG. 8, in end view, grout pipes 34 and 36 are shown being connected to the female connectors 14 of the grout bags 10 to provide a means of supplying grout to the grout bags 10 comprising the rows of grout bags acting as location and buoyancy control devices for the slip liner 4 in the sewer 2 during grouting operations. Also shown is an uninflated grout bag 40 having ends 42 and 44 wrapped about the slip liner 4 in the annular space 32 between the slip liner 4 and sewer 2. At the desired time, the ends 42 and 44 of bulkhead grout bag 40 are used to supply grout to inflate the bulkhead grout bag 40 to seal the annular space 32 between the slip liner 4 and sewer 2 so that grout may be pumped into the annular space 32 to completely fill the same.

The bulkhead grout bag 40 is similar in construction and materials with grout bag 10.

Further regarding FIG. 8, since the grout bags 10 have been installed in the annular space 32, the guide cable 30 has been removed in preparation for grouting operations.

Referring to FIG. 9, in end view, grout bags 10 are shown inflated through the use of grout via grout pipes 34 and 36 in the annular space 32 to control the location of the slip liner 4 in the sewer 2. Once inflated, the grout bags 10 prevent the slip liner 4 from upward, flotation, or lateral movement in the annular space 32 with respect to the sewer 2. As shown, the bulkhead grout bag 40 is uninflated.

Figure 10:
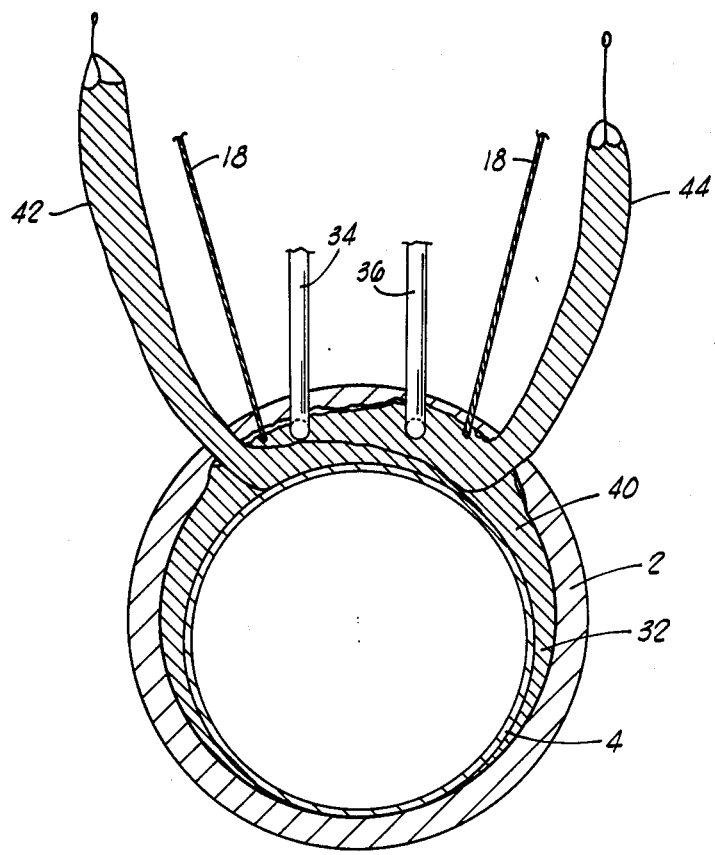
FIG. 10 is an end view of a filled bulkhead grout container of the present invention installed between a slip liner and sewer.

Referring to FIG. 10, the bulkhead grout bag 40 is shown inflated through the ends 42 through the use of grout to fill and seal the annular space 32 between the slip liner 4 and sewer 2. The ends 42 and 44 of the bulkhead grout bag 40 are filled with grout and elevated over the slip liner 4 and sewer 2 to use the hydrostatic pressure of the grout to cause the bulkhead grout bag 40 to conform to the annular space 32 and grip the walls of the slip liner 4 and sewer 2 respectively.

OPERATION OF THE INVENTION

Referring to FIGS. 5 through 10, to prepare a slip liner 4 to be grouted into a sewer 2, the ends of grout bag cables 18 and a guide cable 30 are pulled through a sewer 2 between openings cut therein. The slip liner 4 is then positioned within the sewer 2. The grout bags 10 are then pulled through the annular space 32 between the slip liner 4 and sewer 2.

Next, the bulkhead grout bags 40 are installed in the annular space 32 between the slip liner 4 and sewer 2. Grout pipes 34 and 36 are connected to the rows of grout bags 10 and the grout bags 10 are filled with grout. The filled grout bags 10 are allowed to set for a period of time, typically twenty four (24) hours. Then the bulkhead grout bags 40 are filled with grout and allowed to set for a period of time, typically twenty four (24) hours. At this time any small leaks between the bulkhead grout bags 40 and the slip liner and sewer 2 are sealed using any suitable material to allow grouting of the annular space 32 to proceed through other grout injection points (not shown).

It will be obvious to those of ordinary skill in the art that improvements, additions, deletions or changes may be made to the present invention which are intended fall within the scope of the present invention.

It will be obvious to those skilled in the art that the present invention offers advantages over the prior art apparatus and methods in slip liner grouting.

Having thus described my invention, I claim:

1. An apparatus for controlling the movement of a slip liner in a sewer prior to and during the grouting of said slip liner in position in said sewer to prevent fluid from leaking through the walls of the said sewer, said sewer and said slip liner having water therein during said grouting of said slip liner in position in said sewer, said apparatus to control said movement of said slip liner in said sewer prior to and during said grouting of said slip liner in position in said sewer by preventing movement of said slip liner with respect to said sewer during said grouting of said slip liner in position in said sewer, said apparatus comprising:
   a plurality of inflatable grout bags in the annular space between said slip liner and said sewer for controlling said movement of said slip liner in said sewer prior to and during said grouting of said slip liner in position in said sewer by preventing movement of said slip liner with respect to said sewer during grouting of said slip liner in position in said sewer;
   means interconnecting the plurality of inflatable grout bags in the annulus between said slip liner and said sewer, the means interconnecting the plurality of inflatable grout bags comprising:
   a cable means running along the longitudinal length of each inflatable grout bag of the plurality of grout bags, the cable means being secured to the plurality of grout bags and to the grout bag protectors.

2. The apparatus of claim 1 wherein:
   the plurality of inflatable bags are interconnected to allow the flow of grouting material from one bag of the plurality to another when the inflatable grout bags are inflated with grout.

3. The apparatus of claim 1 wherein:
   the means interconnecting the plurality of inflatable grout bags comprises:

a cable means running along the longitudinal length of each inflatable grouting bag of the plurality of grouting bags, the cable means having a portion thereof secured to a portion of the plurality of grouting bags.

4. The apparatus of claim 1 wherein:
the plurality of inflatable grout bags comprises:
at least two longitudinal rows of inflatable grout bags installed in the annulus between the slip liner and the sewer along the length of the slip liner and sewer; and
the means interconnecting the plurality of inflatable grout bags comprises:
a first cable means running along the longitudinal length of each inflatable grout bag of the plurality of grout bags in each longitudinal row of inflatable grout bags, the first cable means having a portion thereof secured to a portion of the plurality of inflatable grout bags in each longitudinal row of inflatable grout bags; and
at least one second cable means running transversely between each longitudinal row of said inflatable grout bags.

5. A method of controlling the movement of a slip liner in a sewer through the use of a plurality of inflatable grout bags installed in the annulus between said slip liner and said sewer, said method comprising the steps of:
forming openings into said sewer;
installing a guide cable along the length of said sewer between the opening therein;
installing a portion of pull cable connected to said plurality of inflatable grout bags along the length of said sewer between the openings therein;
installing said slip liner in said sewer along the length thereof; and
moving the pull cable connected to said plurality inflatable grout bags to cause said plurality of inflatable grout bags to be position in said annulus between said slip liner and said sewer near the guide cable.

6. The method of claim 5 further comprising the steps of:
using the guide cable as a guide means during the step of moving the pull cable connected to said plurality of inflatable grout bags to cause said plurality of inflatable grout bags to be positioned in said annulus between said slip liner and said sewer.

7. The method of claim 5 further comprising the steps of:
installing an inflatable bulkhead grout bag in said annulus between said slip liner and said sewer.

8. The method of claim 7 further comprising the steps of:
inflating said plurality of inflatable grout bags in said annulus between said slip liner and said sewer; and
inflating the bulkhead grout bags sealing said annulus between said slip liner and said sewer.

9. The method of claim 8 further comprising the step of:
sealing any leaks around the inflated bulkhead grout bag in said annulus between said slip liner and said sewer.

10. The method of claim 8 wherein:
said plurality of inflatable grout bags are inflated with grout which is allowed to set before the inflatable bulkhead grout bag is inflated.

11. The method of claim 5 further comprising the steps of:
installing at least one grout pipe connected to at least one inflatable grout bag of said plurality of inflatable grout bags.

12. The method of claim 5 further comprising the steps of:
inflating said plurality of inflatable grout bags with grout.

13. The method of claim 12 further comprising the steps of:
allowing the grout to set in said plurality of inflatable grout bags.

14. The method of claim 5 further comprising the step of:
installing grout bag protectors to protect a portion of each of the inflatable grout bags of said plurality of inflatable grout bags.

15. The method of claim 5 further comprising the step of:
installing a portion of a second pull cable connected to a second plurality of said inflatable grout bags along the length of said sewer between the openings therein; and
moving the second pull cable connected to the second plurality of said inflatable grout bags to cause the second plurality of said inflatable grout bags to be positioned in annulus between said slip liner and said sewer.

* * * * *

UNITED STATES PATENT AND TRADEMARK OFFICE
CERTIFICATE OF CORRECTION

PATENT NO. : 4,889,449
DATED : December 26, 1989
INVENTOR(S) : Lindsey D. Lee

It is certified that error appears in the above-indentified patent and that said Letters Patent is hereby corrected as shown below:

In column 5, line 40, delete the word [position] and insert therefore --positioned--.

Signed and Sealed this

Fourteenth Day of June, 1994

Attest:

BRUCE LEHMAN

*Attesting Officer*        *Commissioner of Patents and Trademarks*